C. LUETTERS.
Pocket-Knife.
No. 200,551.  Patented Feb. 19, 1878.
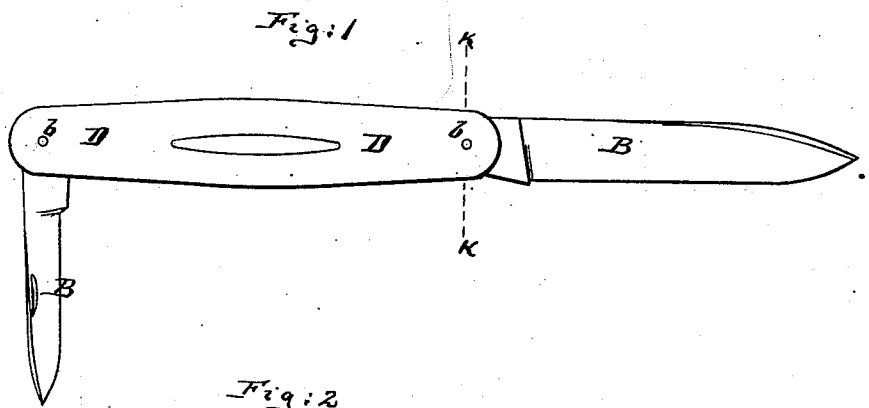
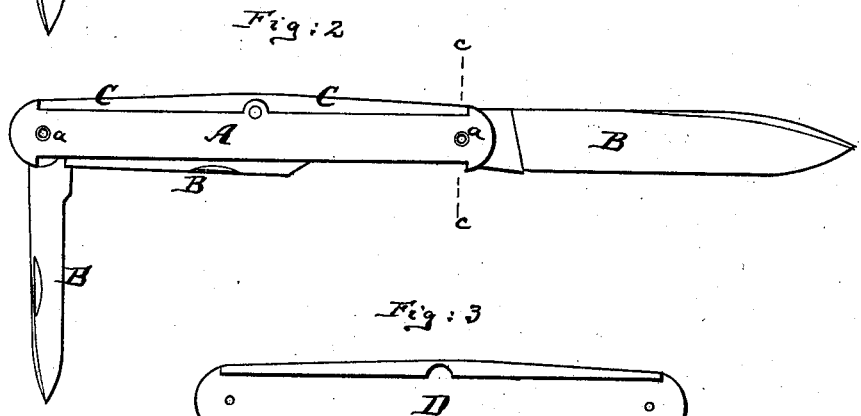
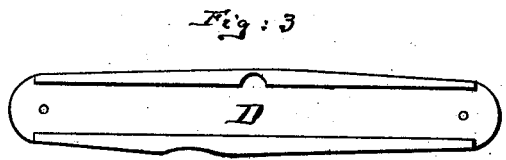
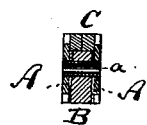 
Witnesses:
John C. Tunbridge.
A. v. Briesen
Inventor:
Carl Luetters
by his attorney
A. v. Briesen

UNITED STATES PATENT OFFICE.

CARL LUETTERS, OF SOLINGEN, GERMANY.

IMPROVEMENT IN POCKET-KNIVES.

Specification forming part of Letters Patent No. 200,551, dated February 19, 1878; application filed January 28, 1878.

*To all whom it may concern:*

Be it known that I, CARL LUETTERS, of Solingen, Germany, have invented a new and useful Improvement in Pocket-Knives, of which the following is a specification:

Figure 1 is a side view of my improved pocket-knife. Fig. 2 is a side view of the same without its external shell or cover. Fig. 3 is an inner face view of the said shell or cover; Fig. 4, a cross-section on the line $c\ c$, Fig. 2; Fig. 5, a cross-section on the line $k\ k$, Fig. 1.

Similar letters of reference indicate corresponding parts in all the figures.

This invention relates to a new manner of securing the parts of a pocket-knife together; and consists, principally, in the use of tubular rivets for fastening the cheeks of the knife and its blades together, said rivets holding all the working parts, entirely independent of the solid rivets that secure the shells; also, in combining therewith solid rivets, which are passed through the tubular rivets, and serve to hold the outer shells or covers in place on the cheeks, all as hereinafter more fully described and claimed.

By the use of the tubular rivets the knife-manufacturer is enabled to properly connect the metallic parts of the knife into a compact structure; yet the shells may afterward be attached by the thin rivets without requiring them to be screwed or otherwise separately secured to the cheeks.

In the drawing, the letters A A represent the metallic cheeks, B B the blades, and C the springs, of a pocket-knife. The blades and cheeks are connected together by hollow tubular rivets $a\ a$, which serve also as pivots for the blades. These tubular rivets, inasmuch as they do not extend through the outer shells, are much shorter, and therefore also stronger, than the ordinary rivets. I am enabled to make the knife complete, excepting the shells, whereas with the use of ordinary long rivets the parts could only be joined together with the shells, not without the same.

D D are the shells or covers for the cheeks. These shells may be made of costly woods, mother-of-pearl, or any other material, and are preferably grooved on the inner faces, as indicated, so that they may lap over and, to a large extent, conceal the cheeks. These shells are secured to the knife by solid, but thin, rivets $b\ b$, which are passed through the hollow rivets $a$, as shown in Fig. 5, and which serve, therefore, to hold the shells in place without in any manner weakening or interfering with the cheeks.

I do not claim tubular rivets, nor tubular bushings for rivets, in pocket-knives; but I do claim—

1. In a pocket-knife, the combination of the cheeks A A and blade or blades B with the tubular rivets $a\ a$, which hold said cheeks and blades firmly together, and which do not extend beyond the metal cheeks, and are adapted to receive the longer rivets that hold the shells, substantially as herein shown and described.

2. In a pocket-knife, the combination of the cheeks A A and blade or blades B, and short tubular rivets $a$, with the longer solid rivets $b$ and shells D, all arranged so that the long rivets and shells can be applied after the other parts have been riveted together, substantially as herein shown and described.

The above description of my invention signed by me this 24th day of December, 1877.

CARL LUETTERS.

Witnesses:
 LOUIS PROLLIUS,
 CORN. CLARENBACH.